United States Patent [19]

Kawabe et al.

[11] Patent Number: 5,349,745
[45] Date of Patent: Sep. 27, 1994

[54] METHOD OF FABRICATING THIN-FILM MAGNETIC HEAD

[75] Inventors: Takashi Kawabe, Hitachi; Eiji Ashida, Hitachiota; Moriaki Fuyama, Hitachi; Tadayuki Iwakura, Hitachi; Hiroshi Fukui, Hitachi; Yoshikazu Tsuji, Kanagawa; Shunichiro Kuwatsuka; Harunobu Saito, both of Odawara; Yoshiki Hagiwara, Hadano; Issei Takemoto, Hiratsuka; Masayasu Fujisawa, Kanagawa, all of Japan

[73] Assignee: Hitachi, Ltd., Tokyo, Japan

[21] Appl. No.: 69,586

[22] Filed: Jun. 1, 1993

[30] Foreign Application Priority Data

Jun. 9, 1992 [JP] Japan .................. 4-149208

[51] Int. Cl.$^5$ ............................................. G11B 5/42
[52] U.S. Cl. ...................... 29/603; 360/126; 427/131; 427/132
[58] Field of Search ............... 29/603; 360/119–121, 360/125–127; 427/130–132, 116

[56] References Cited

U.S. PATENT DOCUMENTS 5,116,719  5/1992  Gau ......................... 29/603 X
5,137,750  8/1992  Amin et al. ............... 29/603 X Primary Examiner—Carl E. Hall
Attorney, Agent, or Firm—Antonelli, Terry, Stout & Kraus

[57] ABSTRACT

A method of fabricating a thin-film magnetic in which a mask pattern in etching a bottom pole is formed of first and second mask films in this order when viewed from the bottom pole, the first mask film is used for defining, by self-alignment, the length of that portion of the side edge of a top pole which is nearly perpendicular to a magnetic gap, the second mask film makes it possible to etch the bottom pole with high dimensional accuracy, a non-magnetic film is formed on the mask pattern having the bottom pole thereunder and the exposed region of a substrate, and the top pole is formed after the mask pattern has been exposed and removed.

9 Claims, 3 Drawing Sheets

METHOD OF FABRICATING THIN-FILM MAGNETIC HEAD

BACKGROUND OF THE INVENTION

The present invention relates to a method of fabricating a thin-film magnetic head which is used in a magnetic recording apparatus (for example, a magnetic disk apparatus or a magnetic tape apparatus), and more particularly to a method of fabricating a thin-film magnetic head which can record information at high density.

In order to increase the recording density of a magnetic recording apparatus, it is necessary to increase a track density by using a thin-film magnetic head having small track width. As to a method of fabricating a thin-film magnetic head having small track width, the following technologies have been proposed.

For example, a Japanese patent application JP-A-2-68,704 discloses a method of fabricating a thin-film magnetic head which method can reduce the crosstalk between adjacent tracks.

Another Japanese patent application JP-A-3-205,607 discloses a method of fabricating a thin-film magnetic head which method can define the track width accurately.

A further Japanese patent application JP-A-4-53,012 discloses a method of fabricating a thin-film magnetic head which method can improve the alignment accuracy of a top pole for a bottom pole.

Reference may further be made to JP-A-61-284,816, JP-A-4-11,311 and U.S. Pat. No. 5,084,957 for related technologies.

SUMMARY OF THE INVENTION

According to the method disclosed in the above-referred JP-A-2-68,704, that portion of the side edge of a top pole which is adjacent to a magnetic gap film, is oblique with respect to the magnetic gap film. Thus, this method has a drawback that the side fringing field generated from the above portion produces an adverse effect upon recording and reproducing characteristics.

According to the method disclosed in the above-referred JP-A-4-53012, that portion of the side edge of a top pole which is adjacent to a magnetic gap film, is nearly perpendicular to the magnetic gap film. However, owing to variations in depth of flattening processing, the length (that is, height) of the above portion is not uniform. Thus, this method has a drawback that recording and reproducing characteristics are degraded.

Further, according to the method disclosed in the above-referred JP-A-3-205,607, it is necessary to form a top pole after taper etching has been carried out for a non-magnetic insulation film. Hence, it is difficult to locate the top pole accurately in relation to a bottom pole. Thus, this method has a drawback that it is impossible to obtain a top pole having an accurate form.

The present invention has been made to overcome the above drawbacks, and it is an object of the present invention to provide a method of fabricating a thin-film magnetic head which includes a pole tip having an accurate form and is excellent in recording and reproducing characteristics.

In order to attain the above object, according to the first aspect of the present invention, there is provided a method of fabricating a thin-film magnetic head which method comprises the steps of: forming a first magnetic film on a substrate; forming a first mask film on the first magnetic film; forming a second mask film on the first mask film, a material for the second mask film being different from a material for the first mask film; etching the second mask film, the first mask film and the first magnetic film to a predetermined pattern; forming a non-magnetic film on the second mask film and the exposed region of the substrate; removing a portion of the non-magnetic film to expose the second mask film; removing the second mask film; removing the first mask film; forming a magnetic gap film on at least the first magnetic film; and forming a second magnetic film on the magnetic gap film, the width of the upper edge of the second magnetic film being larger than the width of the lower edge of the second magnetic film, the lower edge of the second magnetic film being contiguous to the magnetic gap film. It is to be noted that in some cases, the first magnetic film and the second magnetic films will be referred to as "leading pole" and "trailing pole", respectively.

The first mask film is used for defining the length (that is, height) of that portion of the side edge of a top pole (namely, trailing pole) which is contiguous and perpendicular to the magnetic gap film. It is preferable that in the step of etching the first magnetic film, the first magnetic film can be selectively etched without etching the second mask film. Further, it is preferable that in the step of removing the first mask film, the first mask film can be selectively etched without etching the magnetic gap film and/or the first magnetic film.

It is preferable that in the step of etching the first magnetic film and the first mask film, the etching speed of the second mask film is small. Further, it is preferable that in the step of removing the second mask film, the second mask film can be selectively etched without etching the first mask film.

The first and second magnetic films can be formed by the sputtering method, the vacuum evaporation method, the selective plating method, or other methods.

As to an etching method, in order to improve the accuracy of predetermined pattern width, it is desirable to use the sputter-etching method or the ion beam etching method.

The non-magnetic film is used for flattening a surface which includes a protrusion based upon a difference in level between the first magnetic film pattern and the mask film pattern. Even after the thin-film magnetic head has been fabricated, the non-magnetic film is left on both sides of the leading pole. Accordingly, it is preferable that the non-magnetic film can bear a machining operation for forming the air bearing surface of the thin-film magnetic head and can be used as the protection film of the thin-film magnetic head. The non-magnetic film is preferably made of an inorganic oxide such as alumina.

The non-magnetic film can be removed by the grinding or polishing method based upon machining, an etch back method using a planarizing resin and ion beam etching, or the dry etching method. In view of throughput, the machining method is preferably used.

It is preferable that the above fabrication method further comprises a step of forming a tapered portion in the non-magnetic film which step is taken simultaneously with the step of removing the second mask film.

Alternatively, it is preferable that the above fabricating method further comprises the step of forming a tapered portion in the non-magnetic film which step is taken after the step of removing the second mask film has been completed.

Owing to the step of forming the tapered portion, the side edge of that portion of a second magnetic film pattern which is contiguous to the magnetic gap film (namely, the first portion of the second magnetic film pattern) and the side edge of the remaining portion (namely, the second portion) of the second magnetic film pattern, intersect each other so that the angle between the former side edge and the latter side edge is not an acute angle. The tapered portion can be formed in the following manner. That edge portion of a non-magnetic film pattern which is kept in contact with a mask film pattern, is etched to convert an acute-angled corner of the edge portion into an obtuse-angled or rounded corner, thereby forming the tapered portion.

According to the second aspect of the present invention, there is provided a method of fabricating a thin-film magnetic head which method comprises the steps of: forming a first magnetic film on a substrate; forming a magnetic gap film on the first magnetic film; forming a first mask film on the magnetic gap film; forming a second mask film on the first mask film, a material for the second mask film being different from a material for the first mask film; etching the second mask film, the first mask film, the magnetic gap film and the first magnetic film to a predetermined pattern; forming a non-magnetic film on the second mask film and the exposed region of the substrate; removing a portion of the non-magnetic film to expose the second mask film; removing the second mask film; removing the first mask film; and forming a second magnetic film on the magnetic gap film, the width of the upper edge of the second magnetic film being larger than the width of the lower edge of the second magnetic film, the lower edge of the second magnetic film being contiguous to the magnetic gap film.

Further, according to the third aspect of the present invention, there is provided a method of fabricating a thin-film magnetic head which method comprises the steps of: forming a first magnetic head on a substrate; forming a magnetic gap film on the first magnetic film; forming a first mask film on the magnetic gap film; forming a second mask film on the first mask film, a material for the second mask film being different from a material for the first mask film; etching the second mask film, the first mask film, the magnetic gap film and the first magnetic film to a predetermined pattern; removing the second mask film, forming a non-magnetic film on the first mask film and the exposed region of the substrate; removing a portion of the non-magnetic film to expose the first mask film; removing the first mask film; and forming a second magnetic film on the magnetic gap film, the width of the upper edge of the second magnetic film being larger than the width of the lower edge of the second magnetic film, the lower edge of the second magnetic film being contiguous to the magnetic gap film.

According to the second and third aspects of the present invention, in order to improve the uniformity of the thickness of the magnetic gap film, the magnetic gap film is previously formed on the first magnetic film, and the magnetic gap film and the first magnetic film are etched at once by using the mask film as a mask.

In this case, immediately after a mask film pattern has been removed, a second magnetic film pattern can be formed on a magnetic gap film pattern.

It is preferable that the method according to the second aspect of the present invention further comprises a step of forming a tapered portion in the non-magnetic film which step is taken simultaneously with the step of removing the second mask film. Alternatively, it is preferable that the above method further comprises the step of forming a tapered portion in the non-magnetic film which step is taken after the step of removing the second mask film has been completed.

It is preferable that when the second mask film is exposed, the surface of the non-magnetic film is made flat by the grinding or polishing method, since the second mask film can be readily exposed.

A thin-film magnetic head obtained by a fabrication method according to the present invention, has a pole tip made up of a trailing pole and a leading pole which are both exposed to the surface of the magnetic head opposite to a magnetic recording medium, and information is recorded on the magnetic recording medium by the magnetic field from the pole tip. In the above thin-film magnetic head, the trailing pole has a first portion for defining the recording width on the magnetic recording medium, and a second portion for extending a fringing field at the side edge of the first portion in a side direction.

The form of the first portion, especially, the length (that is, height) of the side edge of the first portion for determining the distribution of recording magnetic field is accurately defined by the first mask film. Thus, a high-performance, thin-film magnetic head is obtained.

The thin-film magnetic head according to the present invention has a specified tip form. Accordingly, the side fringing field at the track edge can be reduced, and thus side writing can be reduced. Further, the distribution of the magnetic field generated between magnetic poles can be optimized, and thus a high signal-to-noise ratio is obtained. It is to be noted that the term "tip form" indicates the form of those portions of the first and second magnetic films and the magnetic gap film which are exposed to the surface of the magnetic head opposite to the magnetic recording medium, and the term "track edge" indicates the right and left side edges of a track.

Usually, the magnetic recording medium is moved relative to the thin-film magnetic head in a direction from a lower part toward an upper part. That one of two magnetic poles of the thin-film magnetic head which is located ahead in the above moving direction, is referred to as "leading pole", and the other magnetic pole is referred to as "trailing pole".

In the thin-film magnetic head according to the present invention, it is preferable that the trailing pole and the leading pole satisfy the following conditions: the edge of the leading pole on the trailing-pole side is larger in width than the edge of the trailing pole on the leading-pole side, the trailing pole is made up of the first portion formed on the leading-pole side and the second portion adjacent to the first portion and greater in width than the first portion, and the side edge of the leading pole and the side edge of the first portion of the trailing pole substantially lie on the same straight line.

Alternatively, it is preferable that the trailing pole and the leading pole satisfy the following conditions: the edge of the leading pole on the trailing-pole side is larger in width than the edge of the trailing pole on the leading-pole side, the trailing pole is made up of the first portion formed on the leading-pole side and the second portion adjacent to the first portion and greater in width than the first portion, and the side edge of the leading pole is substantially parallel to the side edge of the first portion of the trailing pole.

In these cases, it is preferable that a difference between the width of that edge of the leading pole which is kept in contact with the magnetic gap film (namely, the width of the upper edge of the leading pole) and the width of that edge of the trailing pole which is kept in contact with the magnetic gap film (namely, the width of the lower edge of the trailing pole), is made smaller than or equal to a value which is twice larger than the length (that is, thickness) of the magnetic gap film, since the side fringing field at the edges of a track can be reduced.

Further, in order to reduce the side fringing field, the length (that is, height) of the side edge of the first portion of the trailing pole is preferably made larger than the length (that is, thickness) of the magnetic gap film.

Additionally, it is preferable that an angle between the side edge of the first portion of the trailing pole and that edge of the trailing pole which is kept in contact with the magnetic gap film (namely, the lower edge of the trailing pole) lies in a range from 60 to 110°. The reason for this is as follows. When the above angle is smaller than 600 the saturation of magnetic flux readily occurs at the corner edge of a magnetic pole. Thus, recording characteristics are degraded. When the above angle is greater than 1100 the side fringing field will spread more than needed. Thus, it becomes impossible to define the recording width accurately.

Further, when the trailing pole is formed so that the angle between the side edge of the first portion and the side edge of the second is not an acute angle, the effect of the present invention will be heightened.

Additionally, according to the present invention, there is provided a magnetic recording apparatus mounted with such a thin-film magnetic head which apparatus includes a magnetic recording medium for recording information thereon at a track density greater than 2540 TPI (that is, 1,000 tracks per cm), a thin-film magnetic head having a pole tip formed of those portions of a leading pole and a trailing pole which are exposed to the surface of the magnetic head opposite to the magnetic recording medium, for recording information on the magnetic recording medium by the magnetic field from the pole tip, and means for moving the magnetic recording medium relative to the thin-film magnetic head, and in which apparatus the sum of the smallest width of the trailing pole and the largest width thereof is smaller than or equal to a value which is twice larger than the reciprocal of a track density.

Further, according to the present invention, there is provided a magnetic recording apparatus mounted with a thin-film magnetic head such as mentioned above which apparatus includes a magnetic recording medium for recording information thereon, a thin-film magnetic head having a pole tip formed of those portions of a leading pole and a trailing pole which are exposed to the surface of the magnetic head opposite to the magnetic recording medium, for recording information on the magnetic recording medium by the magnetic field from the pole tip, and means for moving the magnetic recording medium relative to the thin-film magnetic head, and in which apparatus the length of the straight line portion of the magnetization transition formed on the magnetic recording medium is greater than the width of the edge of the trailing pole on the leading-pole side.

Such a magnetic recording apparatus is high in S/N ratio, and can record information on a narrow track.

The above magnetic recording apparatus can be realized by using a trailing pole which has a first portion for defining the recording width on the magnetic recording medium, and a second portion for extending the fringing field at the side edge of the first portion in the side direction.

Actually, a magnetic recording apparatus mounted with a thin-film magnetic head according to the present invention is required to satisfy a relation between the tip form and the track density TD ($1/\mu m$) of the apparatus. In other words, it is necessary to use a thin-film magnetic head, in which the sum ($\mu m$) of the width of the lower edge of the first portion of the trailing pole and the largest width of the second portion of the trailing pole is smaller than or equal to a value which is twice larger than the reciprocal of the track density (namely, the number of tracks per $\mu m$). By using such a thin-film magnetic field, the track width can be reduced. Further, even in a case where the track density is increased, the magnetic recording apparatus is high in S/N ratio, and can show excellent recording/reproducing characteristics. Specifically, such a thin-film magnetic head is effective for realizing a magnetic recording apparatus having a track density greater than $0.1/\mu m$ or an areal recording density greater than 0.15 Mbs/mm$^2$.

By using such a thin-film magnetic head, a magnetic recording apparatus can be realized which is provided with a head disk assembly including 11 hard disks or less and having a storage capacity greater than 3 Gbytes. In this case, each hard disk has a diameter of 5 to 8 inches (that is, 13 to 20 cm).

Further, by using the above thin-film magnetic head, a magnetic recording apparatus can be realized which includes a hard disk with a diameter of 2 to 4 inches (that is, 5.1 to 10.2 cm), has an outer height less than 42 mm, and has a storage capacity greater than 2 Gbytes A magnetic recording apparatus according to the present invention may include a thin-film magnetic write head and a thin-film magnetic read head using a magneto-resistive film. In this case, it is preferable that the track width of the thin-film magnetic write head is larger than the track width of the thin-film magnetic read head, and a difference between the former track width and the latter track width lies in a range from 0.1 to 2 $\mu m$ According to the fourth aspect of the present invention, there is provided a method of fabricating a thin-film magnetic head which method comprises the steps of: forming a first magnetic film on a substrate; forming a mask film on the first magnetic film, the mask film being smaller in width than the first magnetic film; etching the first magnetic film to a predetermined depth while using the mask film as a mask; forming a non-magnetic film on the mask film, the thinned first magnetic film and an exposed region of the substrate; making the non-magnetic film flat to expose the mask film; removing the mask film; forming a magnetic gap film on at least the first magnetic film; and forming a second magnetic film on the magnetic gap film, the width of the upper edge of the second magnetic film being larger than the width of the lower edge of the second magnetic film, the lower edge of the second magnetic film being contiguous to the magnetic gap film.

Further, according to the fifth aspect of the present invention, there is provided a method of fabricating a thin-film magnetic head which method comprises the steps of: forming a first magnetic film on a substrate; forming a magnetic gap film on the first magnetic film; forming a mask film on the magnetic gap film, the mask film being smaller in width than the first magnetic film; etching the magnetic gap film and the first magnetic film to a predetermined depth while using the mask film as a mask; forming a non-magnetic film on the mask film, the thinned first magnetic film and an exposed region of the substrate; making the non-magnetic film flat to expose the mask film; removing the mask film; and forming a second magnetic film on the magnetic gap film, the width of the upper edge of the second magnetic film being larger than the width of the lower edge of the second magnetic film, the lower edge of the second magnetic film being contiguous to the magnetic gap film.

In a thin-film magnetic head obtained by one of the above fabrication methods, the leading pole has a third portion formed on the trailing-pole side, and a fourth portion which is contiguous to the third portion and is larger in width than the third portion.

When, like the trailing pole, the leading pole is made up of two portions, that is, the third portion contiguous to the magnetic gap film and the fourth portion contiguous to the third portion and larger in width than the third portion, high-density recording can be achieved. Specifically, it is preferable that the length (that is, height) of the side edge of the third portion is larger than the length (that is, height ) of the side edge of the first portion.

Further, when the second magnetic film pattern (that is, trailing pole ) is formed by the above fabrication methods, the trailing pole can have a desired form without using a special etching method. When the second magnetic film pattern is formed so that the upper edge of the second magnetic film pattern is larger in width than the lower edge thereof (that is, that edge of the second magnetic film pattern which is kept in contact with the magnetic gap film), to prevent the adverce effect of a difference in level between the non-magnetic film and the magnetic gap film on the formation of the second magnetic film, the dimensional accuracy of the second magnetic film pattern is improved.

The mask film can be made of various material such as resin, metal and an inorganic oxide. In order to etch the first magnetic film selectively by using the mask film as a mask, however, it is preferable that the mask film is made of a material selected from a group consisting of a photoresist substance, Nb, Ta, Ti, $TiO_2$, $Al_2O_3$, Si, $SiO_2$ and C.

As mentioned above, according to the present invention, the crosstalk between adjacent tracks can be reduced by adjusting or controlling the side fringing field at the track edge. As a result, the side writing at the track edge is prevented, and the S/N ratio is improved.

Further, according to the present invention, even in a case where the track width is further reduced, the pole tip has a form capable of optimizing the side fringing field distribution. Thus, the S/N ratio can be improved.

Additionally, according to the present invention, the edges of the top and bottom poles can be appropriately formed in accordance with an actual fabrication process.

Now, explanation will be made of the reason why a thin-film magnetic head having a desired, accurate tip form on the basis of a fabrication method according to the present invention is excellent in recording and reproducing characteristics and can record information on a narrow track.

The performance of a thin-film magnetic head is affected by the magnetic field distribution generated at a magnetic gap portion. Specifically, when the track width is reduced, the effect of the above magnetic field distribution becomes remarkable. By optimizing the magnetic field distribution, the form of the magnetization transition recorded on a magnetic recording medium can be optimized. Thus, a thin-film magnetic head is realized which is small in crosstalk and large in S/N ratio.

The fringing field distribution at the track edge is mainly determined by the form of that portion of the side edge of the top pole (that is, trailing pole) which is contiguous to the magnetic gap film.

It is preferable that the side edge of the top pole meets the following conditions.

① That portion of the side edge of the top pole which intersects the magnetic gap film, is nearly perpendicular to the magnetic gap film, that is, the above portion makes an angle of 60 to 110° with the magnetic gap film.

② That portion of the top pole which exists at a distance from the magnetic gap film, is larger in width than that portion of the top pole which is kept in contact with the magnetic gap film.

③ The length (that is, height) of that portion of the side edge of the top pole which is nearly perpendicular to the magnetic gap film, lies in a predetermined range, and the top pole is accurately located in relation to the bottom pole.

The above conditions will be explained, with reference to the drawings.

The magnetic field distribution at the track edge of a thin-film magnetic head having magnetic poles of a conventional form is indicated by a broken line shown in FIG. 3A. In FIG. 3A, a broken line 34 indicates a field contour line in a case where the magnetic field is generated in the same direction as the direction of coercive force in the magnetic recording medium, that is, the magnetic field is generated in an x-direction corresponding to the longitudinal direction. Further, in FIG. 3A, reference numeral 31 designates a trailing pole, 32 a leading pole, and 33 a magnetic gap. Reference character A in FIG. 3A designates a side writing portion due to the fringing field at the track edge.

Specifically, the form of that portion of the field contour line which exists on the trailing-pole side, defines the form of the magnetization transition recorded on the magnetic recording medium, and is important for recording and reproducing characteristics.

As shown in FIG. 3A, at the track edge, that portion of the field contour line which exists on the trailing-pole side is bent to the leading-pole side, as the distance between the field contour line and the magnetic head is larger. As a result, magnetization transition having a curved form is formed on the magnetic recording medium in a recording period. Thus, a peak shift or noise is readily generated in a reproducing period, and the S/N ratio is reduced. In a case where the track width is made very small, specifically, in a case where the track density is made greater than or equal to 2540 TPI (that is, 1,000 tracks per cm), the effect of that portion of the field contour line which exists on the track edge, cannot be neglected.

While, FIG. 3B shows the magnetic field distribution formed by a thin-film magnetic head having the trailing and leading poles of a novel form on the basis of a fabrication method according to the present invention. In this thin-film magnetic head, as shown in FIG. 3B, that edge of the leading pole which is kept in contact with a magnetic gap (namely, the upper edge of the leading pole) is a little larger in width than that edge of the trailing pole which is kept in contact with the magnetic gap (namely, the lower edge of the trailing pole), and the side edge of the leading pole and the side edge of that portion of the trailing pole which exists near the magnetic gap, lie substantially on the same straight line, or are substantially parallel to each other. The magnetic field distribution due to such a pole structure can reduce the fringing field at the track edge.

Further, the second portion (that is, the portion having large width) of the trailing pole protrudes from the side edge of the first portion (that is, the portion having small width) of the trailing pole. Owing to the magnetic field generated from the protruding part of the second portion, as indicated by the broken line of FIG. 3B, the field contour line on the trailing pole side approaches a straight line, as compared with the field contour line of FIG. 3A. As a result, the form of the magnetization transition recorded on the magnetic recording medium approaches a straight line. Thus, the generation of a peak shift and noise due to the magnetization transition at the track edge is prevented, and the S/N ratio is improved.

Furthermore, when the length (that is, height) and inclination of the side edge of the first portion of the trailing pole, the angle between the side edge of the first portion and the side edge of the second portion, a difference in width between the upper and lower edges of the trailing pole, and other factors are appropriately controlled, the spread of the side fringing field is suppressed, and the form of the field contour line is optimized. That is, the effect of the present invention can be fully exhibited.

While, in a dual-element head made up of a thin-film magnetic write head according to the present invention and a thin-film magnetic read head using a magnetoresistive film, it is preferable that the track width of the write head is 0.1 to 2 $\mu$m larger than the track width of the read head, because an output from that portion of the magnetization transition at the track edge which has the form of a straight line, can be utilized at its maximum.

The effect of the present invention is achieved mainly by the combination of the first and second pottions of the trailing pole. That is, it is important that the trailing pole is made up of the first portion for defining the recorded track width and the second portion for extending the fringing field at the side edge of the first portion in a side direction to make the field contour line approach a straight line.

As can be seen from the above, it is important to put the length of that portion of the side edge of the top pole which is nearly perpendicular to a magnetic gap, in a predetermined range. When the length of the above portion is too small, the portion does not have the effect of defining the recorded track width, and thus the track width is increased. On the other hand, when the length of the above portion is too large, the second portion of the trailing pole loses the effect of extending the fringing field in a side direction. It is preferable to put the length of that portion of the side edge of the trailing pole which is nearly perpendicular to the magnetic gap, in a range from 0.4 to 1.0 $\mu$m.

Further, in a magnetic recording apparatus mounted with a thin-film magnetic head according to the present invention, it is necessary that the sum of the largest width of the trailing pole and the track width of the magnetic head is smaller than or equal to a value which is twice larger than a track density. The reason for this will be explained below.

Let us consider schematically the form of that surface of a thin-film magnetic head according to the present invention which confronts a magnetic recording medium, and a track recorded on the magnetic recording medium. The width of the track recorded on the magnetic recording medium is substantially determined by the width of the lower edge of the trailing pole. A guard band is provided between adjacent tracks to reduce crosstalk. When that portion of the trailing pole which has the largest width, is extended to an adjacent track, data on the adjacent track may be partially erased by the thin-film magnetic head according to the present invention, and moreover off-track noise may be increased. In order to avoid such difficulties, it is necessary to satisfy the following relations:

largest width of trailing pole $\leq$ (width of recorded track) +

2x (width of guard band) $\approx$
(width of lower edge of trailing pole) +
2x {(1/track density) − (width of lower edge of trailing pole)} =

(2/track density) − (width of lower edge of trailing pole)

That is, it is necessary to satisfy the following relation:

(width of lower edge of trailing pole) +

(largest width of trailing pole) $\leq$ (2/track density)

By satisfying the above relation, a thin-film magnetic head is realized which is high in S/N ratio and excellent in recording and reproducing characteristics.

In a method of fabricating a thin-film magnetic head in accordance with the present invention, it is preferable that the mask film has the two-layer structure, that is, the mask film is made up of first and second mask films.

The first mask film is used for controlling the length of that portion of the side edge of the top pole which is nearly perpendicular to a magnetic gap. The second mask film is used as a mask in etching the first magnetic film.

That is, it is important that when the first mask film and the first magnetic film (which includes the magnetic gap film in some cases) are etched by using the second mask film as a mask, the etching speed of the second mask film is smaller than the etching speed of each of the first mask film and the first magnetic film. Thus, the width of the bottom pole is accurately determined, and the track width is accurately defined.

By the above etching, the thickness of the second mask film is reduced, and moreover the etching depth varies widely. That is, it is difficult to control the remaining thickness of the second mask film. Accordingly, it is difficult to determine the length of that portion of the side edge of the top pole which is nearly perpendicular to a magnetic gap, by means of the second mask film.

In a method of fabricating a thin-film magnetic head in accordance with the present invention, a portion having an important effect on the characteristics of the thin-film magnetic head, is controlled by the first mask film. Thus, it is unnecessary to control the thickness of the above portion by the second mask film whose thickness is non-uniformly reduced by the etching for the first mask film and the first magnetic film.

In more detail, the first mask film is formed beneath the second mask film. Thus, even in a case where the remaining thickness of the second mask film varies, the length of that portion of the side edge of the top pole which is nearly perpendicular to the magnetic gap, can be determined on the basis of the thickness of the first mask film.

That is, even after a portion of the non-magnetic film which is formed on the second mask film and a substrate, has been removed together with the second mask film, a space corresponding to the thickness of the first mask film is secured in the non-magnetic film. Thus, the second magnetic film having a desired form can be readily formed.

Further, according to the present invention, the second magnetic film (that is, top pole) is accurately located in relation to the first magnetic film (that is, bottom pole) by the self-alignment method. Thus, the positional deviation of the top pole from the bottom pole is removed, and a desired tip form is obtained.

Further, according to the present invention, a tapered portion is formed at an edge of the non-magnetic film to improve the step coverage of the films deposited above the tapered portion.

Furthermore, according to the present invention, the first magnetic film is formed on a flat substrate through an etching process. Accordingly, the first magnetic film can be formed with higher dimensional accuracy, as compared with a case where the first magnetic film is formed on a plate having a difference in level. As a result, a thin-film magnetic head is obtained which has accurate track width.

DESCRIPTION OF THE PREFERRED EMBODIMENTS

Figure 1A:
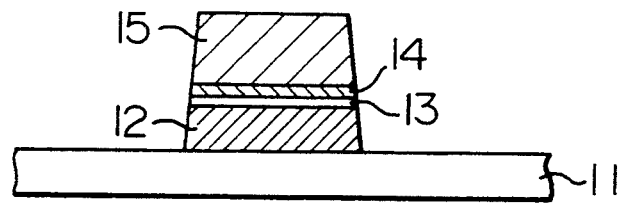
FIGS. 1A to 1F are sectional views for explaining steps of an embodiment of a method of fabricating a thin-film magnetic head in accordance with the present invention.
Figure 1B:
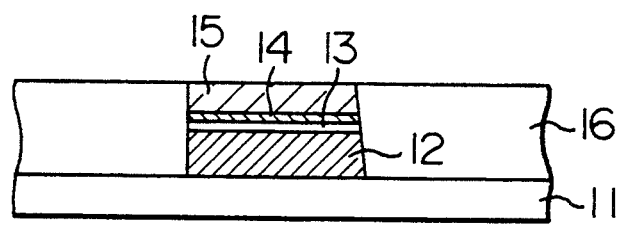
Figure 1C:
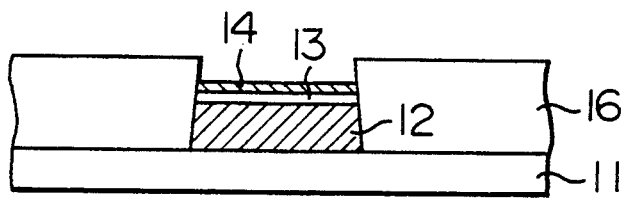
Figure 1D:
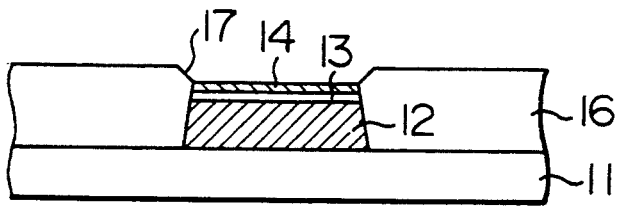
Figure 1E:
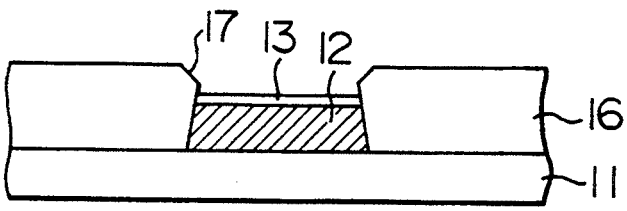
Figure 1F:
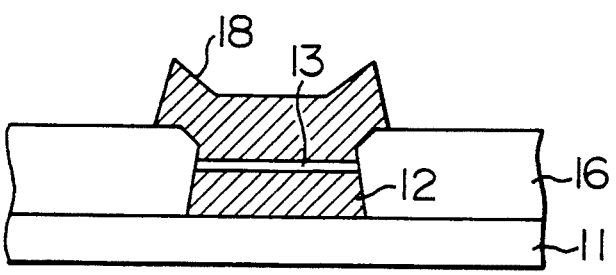

Embodiments of the present invention will be explained below, with reference to the drawings. FIGS. 1A to 1F are sectional views for explaining steps of an embodiment of a method of fabricating a thin-film magnetic head in accordance with the present invention, and each of FIGS. 1A to 1F shows a cross section of a magnetic pole portion, viewed from that surface of the magnetic head which confronts a magnetic recording medium. Now, the present embodiment will be explained, with reference to FIGS. 1A to 1F. An NiFe film 12 serving as a first magnetic film and having a thickness of 2.5 $\mu$m, an $Al_2O_3$ film 13 serving as a magnetic gap film and having a thickness of 0.4 $\mu$m, an Si film 14 serving as a first mask film and having a thickness of 0.4 $\mu$m, and a carbon film 15 serving as a second mask film and having a thickness of 6 $\mu$m, are first piled on a ceramic substrate 11 by the sputtering method. Then, a photoresist pattern containing silicon and having a thickness of 2 $\mu$m is formed on the carbon film 15. The carbon film, the Si film, the $Al_2O_3$ film and the NiFe film are etched while using the photoresist pattern as a mask. In more detail, the carbon film 15 is etched by the reactive ion etching using an oxygen plasma, the Si film 14 is etched by the reactive ion etching using an $SF_6$ plasma, the $Al_2O_3$ film 13 is etched by the reactive ion beam etching using a $CHF_3$ plasma, and the NiFe film 12 is etched by the ion beam etching using an Ar plasma. Thus, the structure of FIG. 1A is obtained. It is to be noted that the photoresist pattern which contains silicon is not shown in FIG. 1A, because the photoresist pattern is automatically removed in the above etching process. Next, an $Al_2O_3$ film 16 serving as a non-magnetic film and having a thickness of 7 $\mu$m is deposited by the sputtering method. Then, the surface is made flat by the polishing method so that the carbon film pattern 15 is exposed. Thus, the structure of FIG. 1B is obtained. At this time, owing to the non-uniformity of polishing, the remaining thickness of the carbon film 15 varies in a range from 0.2 to 1.0 $\mu$m Then, as shown in FIG. 1C, the carbon film pattern 15 is removed by oxygen ion etching. Thereafter, the whole of the structure of FIG. 1C is subjected to the reactive ion beam etching using a $CHF_3$ plasma, to form a tapered portion 17 at the edge of the $Al_2O_3$ film 16. This is based upon the fact that the etching speed of the $Al_2O_3$ film 16 is dependent on the incident angle of the ion beam, and the edge of the $Al_2O_3$ film 16 is etched rapidly. Next, as shown in FIG. 1E, the Si film 14 is removed by the reactive ion etching using an $SF_6$ plasma. Further, an insulating film and a coil are formed, though these members are not shown in FIG. 1E. Finally, an NiFe film 18 serving as a second magnetic film and having a thickness of 3 $\mu$m is formed by the sputtering method, and then etched selectively. Thus, a thin-film magnetic head is obtained which has a pole structure shown in FIG. 1F. According to the present embodiment, when the $Al_2O_3$ film 16 is etched to form the tapered portion 17, the Si film 14 serving as the first mask film functions as a stopper for etching. Thus, independently of wide variations in remaining thickness of the carbon film, that portion of the side edge of the top pole which is nearly perpendicular to the magnetic gap film, has a length greater than or equal to 0.4 $\mu$m, and makes an angle of 82° with the magnetic gap film. Further, the track width lies in a range from (5.9−0.4) to (5.9+0.4) $\mu$m That is, an accurate fabrication process is realized. Further, the upper edge of the top pole has a width of about 7.2 $\mu$m The characteristics of the thin-film magnetic head thus obtained were estimated for a case where the track density is 3500 tracks per inch (0.138/$\mu$m), that is, the track pitch is 7.25 $\mu$m, by using a magnetic disk apparatus. The above thin-film magnetic head was 7.1% higher in S/N ratio than a conventional thin-film magnetic head having the same pole thickness as that of the former thin-film magnetic head. The above thin-film magnetic head was mounted on a magnetic disk apparatus having a 3.5 inch diameter hard disk (namely, a 8.9 cm diameter hard disk). In this case, an areal recording density of 0.35 Mbit/mm² was achieved, and a small-sized magnetic recording apparatus was realized which had a height of 41 mm and a storage capacity of 3GB.

Figure 2A:
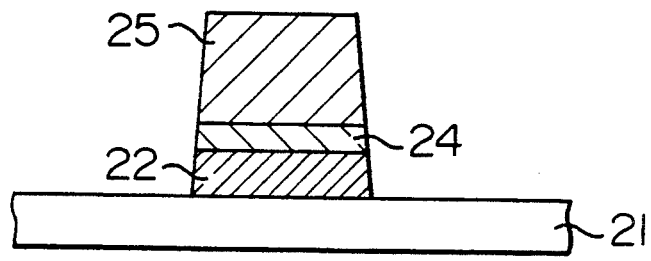
FIGS. 2A to 2E are sectional views for explaining steps of another embodiment of a method of fabricating a thin-film magnetic head in accordance with the present invention.
Figure 2B:
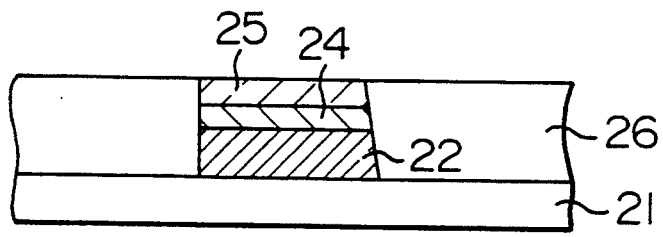
Figure 2C:
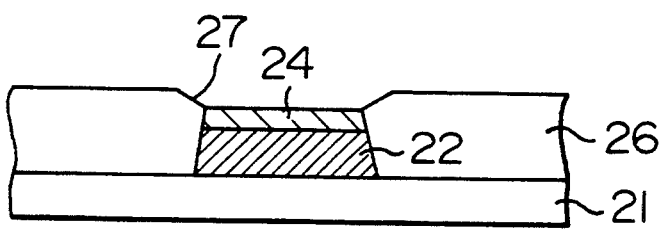
Figure 2D:
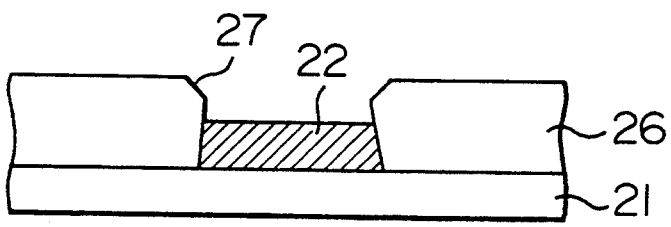
Figure 2E:
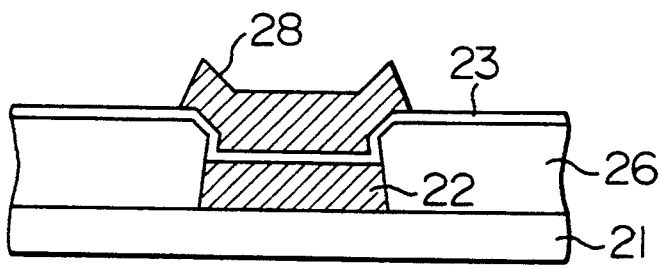
Figure 3A:
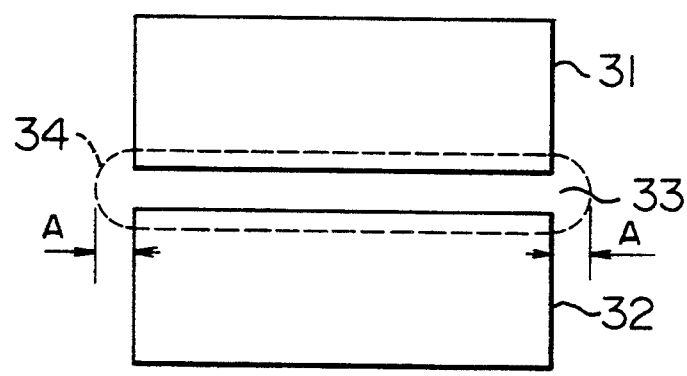
FIG. 3A is a schematic diagram showing a field contour line representative of the magnetic field distribution which is formed at the track edge by conventional thin-film magnetic head.
Figure 3B:
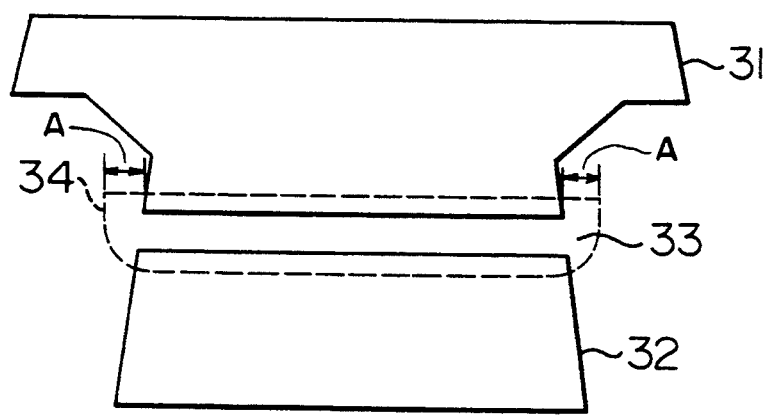
FIG. 3B is a schematic diagram showing a field contour line representative of the magnetic field distribution which is formed at the track edge by a thin-film magnetic head having a tip form according to the present invention.

FIGS. 2A to 2E are sectional views for explaining steps of another embodiment of a method of fabricating a thin-film magnetic head in accordance with the present invention. Now, the present embodiment will be explained with reference to FIGS. 2A to 2E. An NiFe film 22 serving as a first magnetic film and having a thickness of 2.8 μm and an Si film 24 serving as a first mask film and having a thickness of 0.9 μm, are piled on a ceramic substrate 21 by the sputtering method. Then, a novolak resin type photoresist pattern 25 serving as a second mask film and having a thickness of 8 μm is formed on the Si film 24. The Si film 24 and the NiFe film 22 are etched while using the photoresist pattern as a mask. In more detail, the Si film 24 is etched by the reactive ion etching using an $SF_6$ plasma, and the NiFe film 22 is etched by the ion beam etching using an Ar plasma. Thus, the structure of FIG. 2A is obtained. Next, an $Al_2O_3$ film 26 serving as a non-magnetic film and having a thickness of 7 μm is formed on the structure of FIG. 2A by the sputtering method. The surface thus formed is made flat by the polishing method so that the photoresist pattern 25 is exposed. Thus, the structure of FIG. 2B is obtained. At this time, owing to the non-uniformity of etching and polishing, the remaining thickness of the photoresist pattern 25 varies in a range from 0.2 to 0.9 μm. Thereafter, the photoresist pattern 25 is removed by the ion beam etching using a mixed gas of oxygen and $CHF_3$. At this time, a tapered portion 27 is formed at the edge of the $Al_2O_3$ film 26, as shown in FIG. 2C. This is because the $Al_2O_3$ film 26 is etched more slowly than the photoresist pattern 25 by the ion beam from the mixed gas, and thus the formation of the tapered portion 27 and the removal of the photoresist pattern 25 are achieved in the same step. Next, as shown in FIG. 2D, the Si film 24 is removed by the reactive ion etching using an $SF_6$ plasma. Then, an $Al_2O_3$ film 23 serving as a magnetic gap film and having a thickness of 0.4 μm is formed. Further, an insulating film and a coil are formed, though these members are not shown in FIG. 2E. Finally, an NiFe film 28 serving as a second magnetic film and having a thickness of 3.3 μm is formed by the sputtering method, and then etched selectively. Thus, a thin-film magnetic head is obtained which has a pole structure shown in FIG. 2E. According to the present embodiment, when the $Al_2O_3$ film is etched to form the tapered portion 27, the Si film 24 serving as the first mask film functions as a stopper for etching. Thus, independently of wide variations in remaining thickness of the photoresist pattern, that portion of the side edge of the top pole which is nearly perpendicular to a magnetic gap, has a length greater than or equal to 0.4 μm Further, the track width lies in a range from (5.5−0.4) to (5.5+0.4)μm. That is, an accurate fabrication process is realized. Further, the upper edge of the top pole has a width of about 6.8 μm As has been explained in the foregoing, by a fabrication method according to the present invention, a tip form is realized which can reduce the side fringing field at the track edge and can generate favorable magnetic field distribution. Thus, a thin-film magnetic head is realized which is high in S/N ratio. Further, magnetic poles are formed with high dimensional accuracy. Thus, a thin-film magnetic head is obtained which has accurate track width and accurate pole length, and in which the top pole is accurately located in relation to the bottom pole.

We claim:

1. A method of fabricating a thin-film magnetic head, comprising the steps of:
    forming a first magnetic film on a substrate;
    forming a first mask film on the first magnetic film;
    forming a second mask film on the first mask film, a material for the second mask film being different from a material for the first mask film;
    etching the second mask film, the first mask film and the first magnetic film to a predetermined pattern;
    forming a non-magnetic film on the second mask film and the exposed region of the substrate;
    removing a portion of the non-magnetic film to expose the second mask film;
    removing the second mask film;
    removing the first mask film;
    forming a magnetic gap film on at least the first magnetic film; and
    forming a second magnetic film on the magnetic gap film, the width of the upper edge of the second magnetic film being larger than the width of the lower edge of the second magnetic film, the lower edge of the second magnetic film being contiguous to the magnetic gap film.

2. A method of fabricating a thin-film magnetic head as claimed in claim 1, further comprising a step of forming a tapered portion in the non-magnetic film, simultaneously with the step of removing the second mask film.

3. A method of fabricating a thin-film magnetic head as claimed in claim 1, further comprising a step of forming a tapered portion in the non-magnetic film after the step of removing the second mask film has been completed.

4. A method of fabricating a thin-film magnetic head, comprising the steps of:
    forming a first magnetic film on a substrate;
    forming a magnetic gap film on the first magnetic film;
    forming a first mask film on the magnetic gap film;
    forming a second mask film on the first mask film, a material for the second mask film being different from a material for the first mask film;
    etching the second mask film, the first mask film, the magnetic gap film and the first magnetic film to a predetermined pattern;
    forming a non-magnetic film on the second mask film and the exposed region of the substrate;
    removing a portion of the non-magnetic film to expose the second mask film;
    removing the second mask film;
    removing the first mask film; and
    forming a second magnetic film on the magnetic gap film, the width of the upper edge of the second magnetic film being larger than the width of the lower edge of the second magnetic film, the lower edge of the second magnetic film being contiguous to the magnetic gap film.

5. A method of fabricating a thin-film magnetic head as claimed in claim 4, further comprising a step of forming a tapered portion in the non-magnetic film, simultaneously with the step of removing the second mask film.

6. A method of fabricating a thin-film magnetic head as claimed in claim 4, further comprising a step of forming a tapered portion in the non-magnetic film after the step of removing the second mask film has been completed.

7. A method of fabricating a thin-film magnetic head as claimed in claim 1, wherein at least one of the first magnetic film, the first mask film and the second mask film is formed by selective plating method.

8. A method of fabricating a thin-film magnetic head as claimed in claim 1, wherein flattening processing for the surface of the non-magnetic film is carried out to expose the second mask film.

9. A method of fabricating a thin-film magnetic head, comprising the steps of:

forming a first magnetic film on a substrate;

forming a magnetic gap film on the first magnetic film;

forming a first mask film on the magnetic gap film;

forming a second mask film on the first mask film, a material for the second mask film being different from a material for the first mask film;

etching the second mask film, the first mask film, the magnetic gap film and the first magnetic film to a predetermined pattern;

removing the second mask film;

forming a non-magnetic film on the first mask film and the exposed region of the substrate;

removing a portion of the non-magnetic film to expose the first mask film;

removing the first mask film; and forming a second magnetic film on the magnetic gap film, the width of the upper edge of the second magnetic film being larger than the width of the lower edge of the second magnetic film, the lower edge of the second magnetic film being contiguous to the magnetic gap film.

* * * * *